March 16, 1954  R. J. WHITE  2,672,441
ELECTRODE FOR MEASURING ION CONCENTRATION IN SOLUTIONS
Filed Feb. 24, 1949
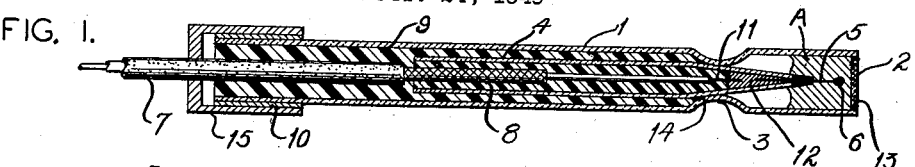
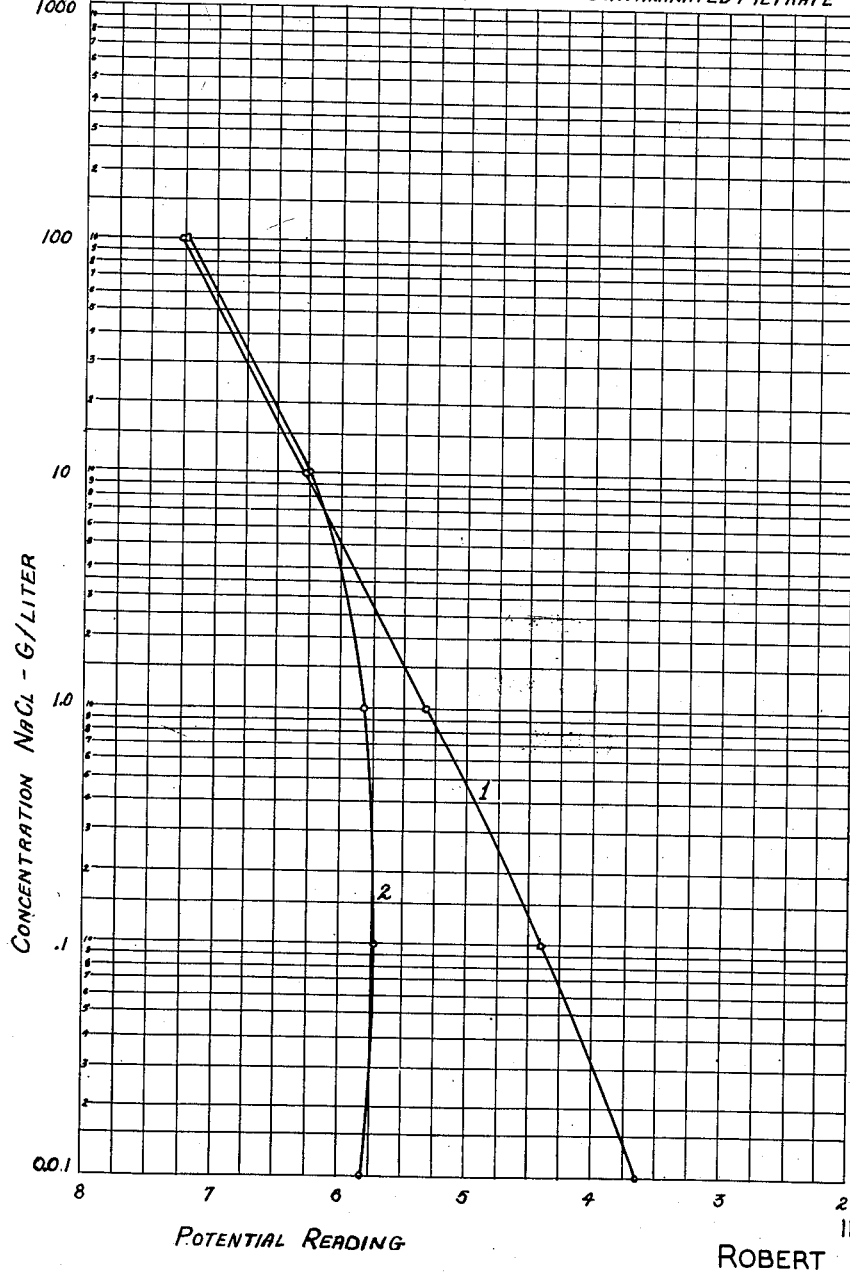
INVENTOR:
ROBERT J. WHITE
BY
ATTORNEYS.

Patented Mar. 16, 1954

2,672,441

UNITED STATES PATENT OFFICE 2,672,441

ELECTRODE FOR MEASURING ION CONCENTRATION IN SOLUTIONS

Robert J. White, Houston, Tex., assignor to National Lead Company, New York, N. Y., a corporation of New Jersey Application February 24, 1949, Serial No. 78,085

3 Claims. (Cl. 204—195)

This invention pertains to a novel method and means, namely, an electrode, for measuring ion concentrations in solutions. More particularly it pertains to a potentiometric method for such determination, such method being applied to the structure of a novel electrode for that purpose.

One of the objects of this invention is to provide a rapid method of determination of ion concentration, more particularly of chloride ion concentration.

Another object is to provide such a method and means as is adapted to determination of ion concentration, particularly chloride ion concentration in solutions containing oxidizing or reducing substances.

Another object is to provide such a method and means which is adapted for continuous recording of the values determined.

Further objects will appear from the following description, in which will be set forth an illustrative embodiment of the invention. It is to be understood, however, that this invention is susceptible of various embodiments, within the scope of the appended claims, without departing from the principles or spirit of the invention.

In the accompanying drawing:

Figure 1 represents a longitudinal, axial section of an electrode embodying this invention. The description below indicates the preferred construction.

Figure 2 is a graph indicating the relative accuracy of the electrode of Figure 1, in a solution containing quebracho extract as a contaminant.

Methods of measuring ion concentrations of solutions by potentiometric methods involve the measurement of potential differences between the solution and electrode, which potential differences are usually very small, so that great accuracy of measurement is required. Moreover, the presence of impurities in the solution often causes so-called "poisoning" of the electrode (by reaction with the impurities) by which the potentials involved may be radically changed. It has been found, however, that by separating the electrode from the solution by a liquid bath of constant concentration and contacting the solution through a suitable membrane, such poisoning effects could be reduced considerably when the membrane includes a substance containing the ion of the solution. The theory of the action may be outlined as follows:

All metals when placed in a solution assume a potential with respect to the solution which is dependent on the concentration of the metal ion in the solution. If we let Ag represent silver metal and Ag+ silver ion and a single bar "|" a phase boundary and a double bar "||" a liquid junction we can write a cell as follows:

Ag | Ag+ ||, reference electrode

The total potential of such a cell is made up of two parts (neglecting the liquid junction potential which can be made very small). These parts are the potential between the silver metal and the solution containing silver ions which we will call E and the potential of the reference electrode which we will call $E_r$ and which is constant. The potential E, however, depends on the concentration of silver ions in the following way $$E = E_{Ag} + \frac{RT}{F} ln[Ag^+]$$

where $E_{Ag}$ is the molal electrode potential which is a constant, R and F are constants, T is the absolute temperature, $ln$ is the natural logarithm and [Ag+] represents the concentration or more accurately the activity of the silver ion in contact with the silver.

When silver chloride is in contact with its saturated solution the product of the concentration of its ions is a constant called the solubility product. Thus we may write $[Ag^+] \times [Cl^-] = K$. If we should introduce into the cell above some solid silver chloride, the silver ion concentration will then depend on the concentration of chloride ion. Such a cell would be written as follows:

Ag, AgCl | Cl− || reference electrode

The potential of this cell to the left of the liquid junction is as before $$E = E_{Ag} + \frac{RT}{F} ln[Ag^+]$$

but now [Ag+] is equal to $$\frac{K}{[Cl^-]}$$

and we may write $$E = E_{Ag} + \frac{RT}{F} ln \frac{K}{[Cl^-]} = E_{Ag} + \frac{RT}{F} lnK - \frac{RT}{F} ln[Cl^-]$$

$E_{Ag}$ and $$\frac{RT}{F} lnK$$

may be combined and written as $E_{AgCl}$ the molal potential of the silver-silver chloride electrode. We then have for the potential of the complete cell $$E = E_{AgCl} + E_r - \frac{RT}{F} ln[Cl^-]$$

and thus have a cell whose potential depends on the chloride concentration. This is the usual silver-silver chloride electrode.

A crystal membrane electrode cell is arranged in a different manner. In this case a silver-silver chloride electrode is placed in a solution of constant chloride concentration and a silver chloride membrane is introduced between this solution and the solution of chloride whose concentration is to be varied. Such a cell would be written thus:

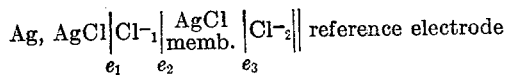

The potential of this cell to the left of the liquid junction is composed now of three potentials, $e_1$, $e_2$, and $e_3$. $e_1$ as before is equal to $E_{AgCl} - RT \ln[Cl_1^-]$. According to Haber the potential between a crystal lattice and its anion would be equal to $$\pi_k - \frac{RT}{F} \ln[\text{anion}]$$

Thus $e_2$ the potential between the solution and the silver chloride crystal is $$e_2 = -\pi_k + \frac{RT}{F} \ln[Cl_1^-]$$

and $$e_3 = \pi_k - \frac{RT}{F} \ln[Cl_2^-]$$

If we add these potentials, the potential to the left of the liquid junction is, $$E = e_1 + e_2 + e_3 = E_{AgCl} - \frac{RT}{F} \ln[Cl_1^-] - \pi_k + \frac{RT}{F} \ln[Cl_1^-] +$$

$$\pi_k - \frac{RT}{F} \ln[Cl_2^-] = E_{AgCl} - \frac{RT}{F} \ln[Cl_2^-]$$

The potential of the complete cell is $$E = E_{AgCl} + E_r - \frac{RT}{F} \ln[Cl_2^-]$$

and we again have a cell whose potential depends on the concentration of chloride on the right or outside of the membrane. In actual cells there will also be included in the right-hand side of the above equation a symmetry potential due to inequalities in the two faces of the membrane.

Referring to Figure 1, 1 designates a hollow tube of pyrex glass, originally about 5 inches long and open at both ends. The right-hand end is closed by a membrane 2. This may be made of porous glass and impregnated with silver chloride. It is cemented or otherwise secured in the open end of the tube 1 so as to seal the opening. This tube is symmetrically necked down at a point 3 about 1 inch from one end. An inner tube 4 also of glass, is prepared by drawing one end to a tapered point and sealing into the point a short piece of platinum wire 5 which extends about ¼ inch beyond the point and extends about an equal distance within the tube. The tapered section of tube 4 is ground into the necked portion of tube 1 to form a secure ground joint seat 14. The inner tube 4 is removed from tube 1 and an electrode element 6 is formed on the end of the wire 5. This may be done by preparing a paste of 90% $Ag_2O$ and 10% $AgClO_3$, applying a small amount to the end of the wire 5 and then heating to decompose it and form a bead of silver-silver chloride, or by other well known means of forming a silver or a silver-silver chloride electrode. A suitable length of rubber covered shielded cable 7 is stripped back on one end to expose a short length of the inner conductor 11 and the shield 8 stripped still further back so that there is no possibility of its making contact with the solder 12 which is then applied so as to form an electrical connection between the inner conductor 11 and the platinum wire 5.

The end of the tube 1 closest to the necked down portion is prepared to receive the membrane. This preparation will take various forms according to the nature of the membrane used. In the electrode illustrated in Figure 1, the tube is ground off square and a membrane of sintered ground glass impregnated with fused silver chloride 2 is cemented by means of a high resistance cement 13 into the end of tube 1 in such a way that there are no leaks in the joint.

A sufficient quantity of approximately 0.1 normal solution of hydrochloric acid to about half fill the space A between the membrane 2 and the neck 3 of the tube 1 is introduced into this space after which tube 4, with its attached cable 7, is inserted and firmly seated in ground joint 14 to seal this space, the free end of cable 7 extending out of the end of the tube 1. Molten pitch 9 is then poured into the upper part of tube 1 to secure the parts in assembled relation. A metal or plastic cap 15 is slipped on the free end of cable 7 and cemented to the end of tube 1 with a lute or cement 10. A suitable electrode terminal is attached to the free end of cable 7.

The porous disc 2 mentioned is a disc formed by sintering a moulded disc made up of ground glass so that it is porous and coherent. The particle size of the ground glass and the degree of sintering determine the porosity. Such discs can also be made from ground Alundum and from Carborundum. In this connection it should be noted that the impregnation with silver chloride must be such that there is no final permeability and no current path except that conducted by the silver chloride itself.

The platinum wire 5 need extend only far enough inside the inner glass electrode so that it may be connected to the inner conductor of the shielded cable by means of the solder. It need not extend beyond the solder. The kind of solder which may be used is ordinary lead-tin solder. The only limitation necessary on the solder is that it melt below the softening point of the glass.

The cement used between the membrane and the glass preferably has high electrical resistance compared to the resistance of the fused silver chloride membrane. The cement used between the glass and the cap is not critical and its only purpose is to secure the cap to the glass tube. The cable 8 has an inner conductor which is separated from the braided shielding of an annulus of insulation; and then this assembly is in turn covered with an exterior covering of insulation. This is very common in electronic devices.

In Figure 2, the ordinates represent the concentration (plotted on a logarithmic scale) in grams per liter of NaCl in a solution contaminated with quebracho extract, and the abscissas represent potential readings on a commercial type of vacuum-tube D. C. voltmeter, namely, a pH meter. Curve 1 represents readings taken with the electrode of Figure 1, and curve 2 readings taken with a commercial silver-silver chloride electrode presently in general use. It will be noted that curve 1 shows a normal change of potential with changing concentration of NaCl in this solution which contains quebracho extract, while curve 2 made with the usual silver-silver chloride electrode fails to do so at concentrations of NaCl below 10 grams per liter. This is due to "poisoning" of the chloride by the quebracho present in the solution.

The invention having thus been described, what is claimed is:

1. An electrode for electro-determination of chloride ion concentration in a solution, comprising, a conductor connectible with potential-measuring means, an electrode element in contact with said conductor composed of silver-silver chloride, a liquid bath containing a constant concentration of hydrochloric acid in which said electrode element is immersed, a watertight membrane of sintered glass containing silver chloride so disposed as to form a conductive path separating said bath from the solution to be measured, and means for mounting all the aforesaid elements in assembled relation to form a manipulatable electrode adapted for insertion into the solution to be measured.

2. An electrode for electro-determination of chloride ion concentration in a solution, comprising, a hollow body of inactive material having a terminal opening, a watertight membrane of coherent sintered comminuted dielectric containing a continuum of silver chloride arranged to close said opening, a liquid bath containing a constant concentration of chloride ions within said body in contact with said membrane, an electrode element of silver-silver chloride immersed in said bath, and an insulated conductor connected to said electrode element and leading out of said body.

3. An electrode for electro-determination of chloride ion concentration in a solution, comprising, a tube of inactive material having a terminal opening, a watertight membrane of sintered glass containing a continuum of silver chloride arranged to close said opening, a liquid bath containing a constant concentration of chloride ions in said tube in contact with said membrane, an electrode element of silver-silver chloride immersed in said bath, and an insulated conductor connected to said electrode element and leading out of said tube.

ROBERT J. WHITE.

References Cited in the file of this patent

"Journal of Physical Chemistry," vol. 17 (1913), pages 344 thru 348.

"Theoretical and Applied Electrochemistry," by Thompson, 3d edition (1939), page 132.